2,983,770
HYDROGENATION OF OLEFINS

Archibald P. Stuart, Media, and James L. Jezl, Swarthmore, Pa., assignors to Sun Oil Company, Philadelphia, Pa., a corporation of New Jersey No Drawing. Filed Mar. 21, 1960, Ser. No. 16,174

7 Claims. (Cl. 260—677)

This invention relates to a novel process for the hydrogenation of olefins and more particularly to a low-temperature process for the hydrogenation of primary and secondary olefinic hydrocarbons catalyzed by aluminum alkyls, aluminum alkyl hydrides, or complexes of aluminum alkyls with titanium halides.

We have discovered that primray and secondary olefins are readily hydrogenated by means of free hydrogen at moderate temperatures and pressures in the presence of a catalytic quantity of an aluminum alkyl, aluminum alkyl hydride, or an aluminum alkyl-titanium chloride complex while such catalysts are ineffective for hydrogenating tertiary olefins. Aluminum alkyls and aluminum alkyl hydrides useful in the practice of the present invention include aluminum trimethyl, aluminum triethyl, aluminum triisobutyl, diethyl aluminum hydride, ethyl aluminum dihydride, and dimethyl aluminum hydride, but any other aluminum alkyl or alkyl hydride may be used in which the alkyl group contains five or less carbon atoms. Complexes useful as catalysts include complexes or reaction products of any of the foregiing compounds with titanium dichloride, trichloride, or tetrachloride. The catalyst should be used in a molar proportion of from about 1% to about 15% based on the moles of non-tertiary olefin in the feed. At concentrations less than about 1% the reaction is very slow, while at concentrations over 15% no improvement in the efficiency of the reaction is obtained by the use of the greater quantity of catalyst.

The particular catalyst to be used in any given hydrogenation will be determined by the nature of the olefin to be hydrogenated, since it is preferred that the catalyst have a boiling point sufficiently different from that of the product that the product may be readily separated from the catalyst by distillation. For example, if the material to be hydrogenated is a propylene trimer or tetramer, a low-boiling catalyst such as trimethyl aluminum or dimethyl aluminum hydride should be used. In such a case it is preferred to add a carrier liquid, such as octane, to the hydrogenated product prior to the distillation, in order to insure complete removal of the catalyst. In the event that the material to be treated is a lower boiling hydrocarbon, such as an olefin-containing mixture of $C_6$ to $C_8$ hydrocarbons, a higer boiling catalyst such as aluminum triethyl, aluminum triisobutyl, or a titanium chloride complex catalyst should be used. In this case it may be advisable to add a higher boiling liquid, such as cetane, to the reaction mixture before distilling, in order to insure that the catalyst is retained in the still bottoms.

We have found that, with the use of the foregoing catalysts, hydrogenation will be initiated at or near room temperature, if the hydrogen pressure over the reaction mixture is maintained at about 500 p.s.i.g. or above, but we prefer to operate at moderately elevated temperatures, say from 150° C. to 300° C., in order to speed the reaction. Hydrogen pressure may be varied from about 500 p.s.i.g. to 10,000 p.s.i.g. or more, but pressures of from about 1000 p.s.i.g. to about 3000 p.s.i.g. are preferred. The mol ratio of hydrogen to hydrogenatable olefin should be from about 2 to about 10 or higher in order to insure that the reaction goes to substantial completion.

While primary and secondary olefins are rather easily hydrogenated by means of free hydrogen under the foregoing conditions, surprisingly, tertiary olefins are extremely resistant to hydrogenation under the same conditions. This curious behavior of tertiary olefins makes possible the use of our new process in the purification of tertiary olefins in those cases in which a pure tertiary olefin is desired as an intermediate for further chemical reaction. For example, 2-methylhexene-2, which boils at 94.5° C., cannot be separated from heptene-1, which boils at 94.9° C., by distillation. If, however, 2-methylhexene-2 contaminated with heptene-1 is treated in accordance with the present invention, the heptene-1 is converted to heptane, boiling at 98.4° C., and a pure 2-methylhexene-2 may be recovered by distillation.

In order that those skilled in the art may more fully appreciate the nature of our invention and the method of carrying it out, the following specific examples are given.

Example I

Fifty ml. of heptene-1 containing 1.23% by weight of aluminum triethyl are charged to a bomb of 310 ml. capacity which has previously been freed of oxygen by flushing with nitrogen, and the bomb is perssured with hydrogen to about 1000 p.s.i.g. at room temperature. The bomb is then heated to 250° C. and is kept at that temperature for 1.6 hours. The first hydrogen uptake is noted as the bomb reaches a temperature of 140° C. indicated by a lowering of hydrogen pressure below that which would be expected at that temperature. The bomb is then depressured and cooled. Analysis of the liquid in the bomb shows that substantially all of the heptene-1 charged has been converted to n-heptane.

Example II

A quantity of heptene-1 containing 1.98% by weight of a catalyst prepared by reacting equimolar quantities of aluminum triethyl and titanium tetrachloride is charged to the bomb, the bomb is pressured with hydrogen to about 1000 p.s.i.g. at room temperature and it is heated to 250° C. and held at that temperature for three hours. After depressuring and cooling, the liquid in the bomb is found to have a bromine number of 2, indicating substantially complete hydrogenation. In this case the initial hydrogen uptake is noted at slightly above room temperature.

Example III

A quantity of heptene-1 containing 5.11% by weight of a catalyst prepared by reacting equimolar quantities of aluminum triethyl and titanium trichloride is charged to the bomb, and the bomb is pressured with hydrogen as before. In this case, however, the bomb is not heated, but is allowed to stand at ambient temperature for 7.5 hours. During this period the temperature of the reaction mixture rises from 25° C. to 45° C. Analysis of the reaction product indicates that 89% of the heptene-1 charged has been converted to n-heptane.

Example IV

A quantity of heptene-2 containing 2.60% by weight of an aluminum triethyl-titanium tetrachloride catalyst is charged to the bomb, the bomb is pressured with hydrogen as before, and it is heated to 250° C. and held at that temperature for 5.3 hours. Initial hydrogen uptake product shows that 95% of the starting material has been converted to n-heptane.

Example V

In this case the charge to the bomb is heptene-3 containing 2.78% by weight of triethyl aluminum. After pressuring with hydrogen to about 1000 p.s.i.g., the bomb is heated to 250° C. and held at that temperature for 11 hours. Initial uptake of hydrogen is noted at 200° C. Analysis of the product shows that it is 90% n-heptane.

Example VI

The charge to the bomb is 2-methylpentene-1 containing 2.15% by weight of aluminum triethyl. The bomb is pressured with hydrogen to about 1000 p.s.i.g., heated to 250° C., and held at that temperature for 4.5 hours. No hydrogen uptake is noted. Analysis of the product, after depressuring and cooling, indicates that only about 2% of the starting material has been hydrogenated. The experiment is repeated, using as a charge 2-methylpentene-1 containing 2.13% by weight of an aluminum triethyl-titanium tetrachloride complex. Again, no hydrogen uptake is noted. Analysis of the product indicates that a considerable proportion of the starting material has been isomerized to 2-methylpentene-2, but only about 3% has been hydrogenated.

Example VII

A mixture of equal volumes of heptene-1 and 2-methylhexene-2 containing 2.0% by weight of a catalyst prepared by reacting equimolar quantities of aluminum triethyl and titanium tetrachloride is charged to a bomb, hydrogen is introduced to a pressure of 1000 p.s.i.g. and the bomb is then heated and maintained at a temperature of 250° C. for three hours. After reaction the mixture is fractionally distilled and a distillate cut amounting to 49% by volume of the original hydrocarbons is obtained. Analysis shows that this cut contains 2-methylhexene-2 in a purity of about 97%. The hydrocarbon residue is mainly n-heptane.

This application is a continuation-in-part of our co-pending application Serial No. 702,549, filed December 13, 1957 and now abandoned.

We claim:

1. A process for hydrogenating non-tertiary olefins which comprises contacting a feed stock comprising at least one olefin selected from the group consisting of primary and secondary olefins with free hydrogen at a pressure in excess of about 500 p.s.i.g., in the presence of a catalyst selected from the group consisting of aluminum alkyls, aluminum alkyl hydrides and titanium chloride-aluminum alkyl complexes, the alkyl groups in said catalysts having 1 to 5 carbon atoms and the molar amount of catalyst being 1–15% of the molar amount of non-tertiary olefin in the feed, for a time sufficient to effect substantial hydrogenation of said olefin.

2. The process according to claim 1 in which the temperature during the contacting is from about 25° C. to about 300° C.

3. The process according to claim 2 in which the hydrogen pressure is from about 1000 p.s.i.g. to about 3000 p.s.i.g.

4. The process according to claim 2 in which the catalyst is aluminum triethyl.

5. The process according to claim 2 in which the catalyst is an aluminum triethyl-titanium trichloride complex.

6. The process according to claim 2 in which the catalyst is an aluminum triethyl-titanium tetrachloride complex.

7. A process for the selective hydrogenation of olefins which comprises contacting a mixture of olefins which includes a tertiary olefin together with at least one olefin selected from the group consisting of primary and secondary olefins with free hydrogen at a pressure in excess of about 500 p.s.i.g., in the presence of a catalyst selected from the group consisting of aluminum alkyls, aluminum alkyl hydrides and titanium chloride-aluminum alkyl complexes, the alkyl groups in said catalysts having 1 to 5 carbon atoms and the molar amount of catalyst being 1–15% of the molar amount of non-tertiary olefin in the feed, for a time sufficient to effect substantial hydrogenation of the non-tertiary olefin component of the feed, and recovering a product composed mainly of the tertiary olefin component.

No references cited.